United States Patent [19]

Komatsu et al.

[11] Patent Number: 4,638,497

[45] Date of Patent: Jan. 20, 1987

[54] FRAMING CODE DETECTOR FOR A TELETEXT RECEIVER

[75] Inventors: Shigeru Komatsu, Yokohama; Keiji Kawata, Kamakura, both of Japan

[73] Assignees: Hitachi, Ltd., Tokyo; Hitachi Video Engineering, Ltd., Kanagawa, both of Japan

[21] Appl. No.: 653,524

[22] Filed: Sep. 24, 1984

[30] Foreign Application Priority Data

Sep. 26, 1983 [JP] Japan .................. 58-176224

[51] Int. Cl.⁴ .................. H04L 7/08; H04J 3/06; H04N 1/36
[52] U.S. Cl. .................. 375/116; 370/41; 370/106; 358/264
[58] Field of Search .......... 375/116, 114, 106, 108, 375/115; 370/41, 47, 100, 106; 358/264, 145; 328/63; 371/47, 67; 340/146.2

[56] References Cited

U.S. PATENT DOCUMENTS

| | | | |
|---|---|---|---|
| 3,597,539 | 8/1971 | Clark | 328/63 |
| 3,800,086 | 3/1974 | Lyons, Jr. et al. | 375/114 |
| 4,065,639 | 12/1977 | Suzuki et al. | 375/116 |
| 4,214,124 | 7/1980 | Jarus | 375/114 |
| 4,340,962 | 7/1982 | Wintzer et al. | 370/100 |
| 4,389,636 | 6/1983 | Riddle, Jr. | 371/47 |

*Primary Examiner*—Robert L. Griffin
*Assistant Examiner*—Andrew J. Telesz, Jr.
*Attorney, Agent, or Firm*—Antonelli, Terry & Wands

[57] ABSTRACT

A framing code detector includes a shift register supplied with a received framing code and a number of EX-OR gates each having one input connected to a respective stage of the shift register and another input which is supplied with a respective bit of a stored pattern having the inverted form of the anticipated framing code to be received/ a counter is provided for counting the number of times all outputs of EX-OR gates become "1" during a predetermined period, and an identification signal is produced when the count value of the counter is greater than a predetermined value.

15 Claims, 3 Drawing Figures

FRAMING CODE DETECTOR FOR A TELETEXT RECEIVER

BACKGROUND OF THE INVENTION

In one type of communication system, character information is transmitted in the form of digital coded signals and received by sampling the transmitted digital coded signals with sampling clock pulses, the sampled signals being used for reproducing character information on a television screen.

As an example, in a Japanese teletext system, the specification for one packet of transmitted data calls for a 16 bit clock run-in pattern "1 0 1 0 1 0 1 0 1 0 1 0 1 0 1 0", an 8 bit framing code "1 1 1 0 0 1 0 1" and 272 bits of character data, as shown in FIG. 1, and this packet is transmitted in one horizontal period of the vertical retrace interval in a conventional television signal. The framing code is used as a start signal for character data, i.e., processing for character data is started immediately after detection of the framing code preceding the character data.

The framing code is defined in accordance with the specification for the particular teletext system, such as "1 1 1 0 0 1 0 0" for an English teletext system and "1 1 1 0 0 1 1 1" for a North American Broadcasting Teletext system. In an area where different teletext specifications are used, it is necessary for proper processing of teletext data to detect the originating teletext specification for the received data, since character data formats are different in accordance with the teletext specification. For this purpose, it seems to be effective for detection of the teletext specification to identify the framing code.

In Japanese published patent application No. 2230/1982, a framing code detector is disclosed which comprises a shift register for converting a received serial framing code into a parallel bit signal, a memory for producing an output signal only when a predetermined address location corresponding to a specified framing code is accessed, and means for supplying said parallel bit signal as an address signal to said memory. However, if the above detector is used for a multi-teletext receiver, the number of detectors provided in the multi-teletext receiver equals the number of framing codes to be detected. This leads to an increase in circuit structure which causes an increase in system cost and a greater possibility of misoperation of the system.

SUMMARY OF THE INVENTION

It is an object of the present invention to provide a framing code detector which can identify a plurality of framing codes with a small circuit structure.

In accordance with the present invention, there is provided memory means for storing a pattern code which may be one of a plurality of framing codes, comparing means for comparing a received framing code with said pattern code to produce an output signal when substantial equality is detected between said received framing code and said pattern code, counter means for counting the generation of said output signal in said comparing means during a predetermined period, and means for writing another pattern code in said member means when a count value by said counting means is less than a predetermined value and for producing an identification signal when said count value is greater than or equal to said predetermined value.

DESCRIPTION OF THE PREFERRED EMBODIMENTS

Figure 2:
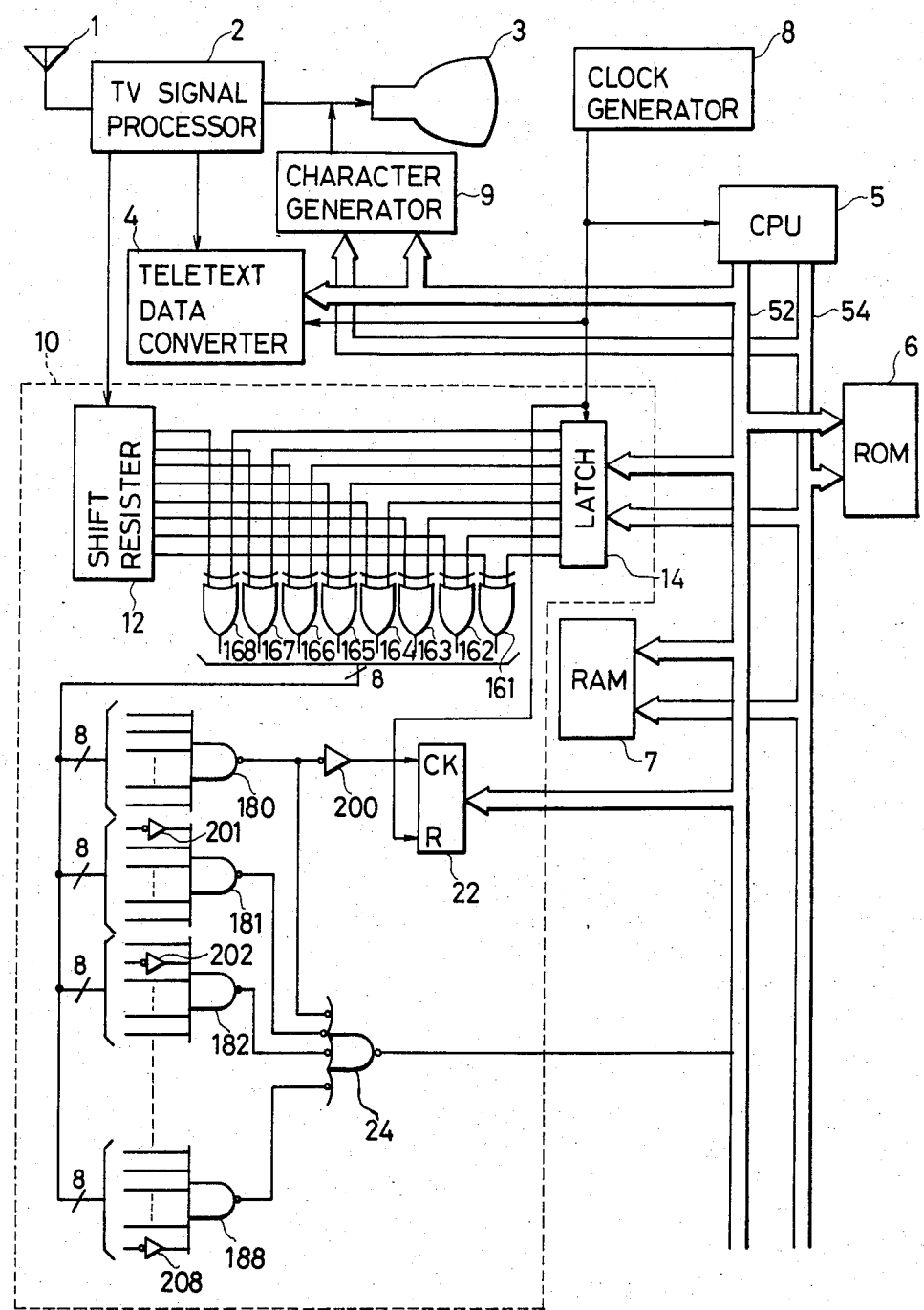

Referring now to FIG. 2, an antenna 1 is connected to TV signal processor 2 for causing picture information from a television signal received by said antenna 1 to be displayed on the screen of a color picture tube 3. A teletext data slicer 4 is connected to the signal processor 2 for slicing digital teletext data from received video signal. A CPU is connected to various devices through a data bus 52 and an address bus 54, including a ROM 6 for storing control data for the CPU 5 to process a received teletext signal, and a RAM 7 for storing the binary parallel data, count values and so so. A clock generator 8 is provided for generating clock pulses for teletext data slicer 4, CPU 5, video display processor 9 and other circuits. A video display processor 9, including a display memory and a parallel-to-serial data converter, is provided for causing character information received and stored in RAM 7 to be displayed on the CRT 3. A shift register 12 converts serial input data to parallel 8 bit data and sends this data to RAM 7 by way of a direct memory access controller (not shown), after the detection of a framing code. These circuits are included in a conventional teletext receiver.

In this embodiment, a framing code detector 10 is provided in place of the known detector. Detector 10 includes the shift register 12 which generates at 8 output lines binary signals which have been serial-parallel converted from the serial 8 bits signal supplied thereto as the framing code through a gate circuit (not shown) which is provided in the TV signal processor 2 only during a framing code period following the run-in period. An 8 bit latch 14, which may be one I/O address location of an address area of CPU 5 stores a pattern code corresponding to one of three pattern codes, the pattern code being selected by CPU 5 in accordance with instructions stored in ROM 6. The framing code detector 10 further includes EX-OR gates 161–168, NAND gates 180–188 each having 8 inputs, NOT gates 200–208, counter 22 for counting the number of pulses input to the CK terminal thereof from the NAND gate 180 after a reset pulse is received at the R terminal, and an NAND gate 24 having 9 inputs, one from each of the NAND gates 180–188.

A pattern code set into latch 14 represents an anticipated framing code in inverted form, and the received framing code is determined to be the same as the anticipated framing code when an EXCLUSIVE OR result between all bits of the framing code as received and the pattern code set in the latch 14 produces a predetermined value. For example, if "1 1 1 0 0 1 0 1" is anticipated as the framing code of the teletext specification to be received, the pattern code "0 0 0 1 1 0 1 0" is set into latch 14. These pattern codes are previously stored in ROM 6 in accordance with various teletext specifications and are transferred to latch 14 from ROM 6 with a predetermined sequence by the CPU 5 when the teletext receiver is able to receive the teletext signal. One input of each EX-OR gate 161–168 is connected to a respective output of shift register 12, and the other input of each EX-OR gate 161-168 is connected to a respective output of latch 14. Therefore, the first, second, ..., and eighth bits of the received framing code and the set pattern code are compared at the EX-OR gates 161-168, respectively, and they produce "1" if the compared bits are different and "0" if the compared bits are the same.

If the set pattern at latch 14 is "0 0 0 1 1 0 1 0" and the received framing code is "1 1 1 0 0 1 0 1", all EX-OR gates 161-168 produce "1". The outputs of each of the EX-OR gates 161-168 are connected respectively to a corresponding input of all NAND gates 180-188, but the first input of NAND gate 181, the second input of NAND gate 182, ..., and the eighth input of NAND gate 188 is connected to the output of a respective EX-OR gate 161-168 through a respective NOT gate 181-188. Since the output of NAND gate 180 is connected through NOT gate 200 to the CK terminal of the counter 22, it counts up one for each reception of a framing code in which all bits are different from all bits of the pattern set in latch 14. Therefore, the received framing code can be identified as that corresponding to the pattern set in latch 14 if the count value output from counter 22 after a predetermined period following the supply of the reset pulse to the R terminal of counter 12 compares with the number which is equal to or nearly equal to the number of times the framing code is transmitted during the predetermined period.

As an example, the predetermined period may correspond to 10 field periods during which 20 framing codes are transmitted. The count value from counter 22 is compared with a value "17" stored in ROM 6 by CPU 5 after receipt of 10 fields following the rest pulse. If the count value is greater than 17, CPU distinguishes that a teletext signal having a desired framing code is received, and if the count value is equal to or less than 17, CPU 5 distinguishes that a teletext signal having an unexpected framing code has been received. If the desired framing code is detected, the teletext receiver is placed in normal condition for processing the teletext signal under the control of CPU 5. If the unexpected framing code is detected, another pattern code corresponding to another framing code is set in latch 14 by CPU 5 and the comparing operation is carried out again.

Any desired framing code which fails to produce a comparison result from NAND gate 180 due to a one bit error is supplied to the NAND gates 181-188 and will be detected as the desired framing code with a bit error. As an example, if the second bit of the received framing code is incorrect, NAND gate 182 will be supplied with the desired framing code without a bit error, and an output of NAND gate 24 will be produced for each reception of the desired framing code within one bit error. The output of NAND gate 24 is used as a start signal for processing teletext data following the framing code.

Figures 1, 3:
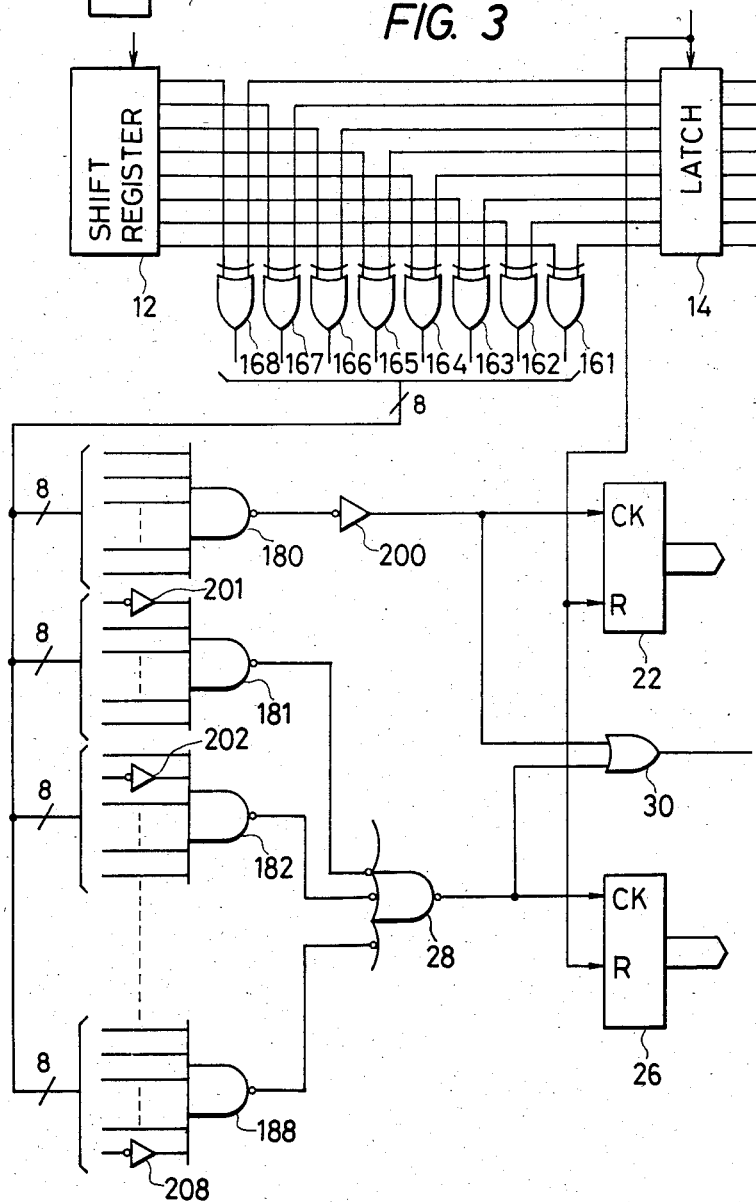
FIG. 1 shows a typical form of a teletext signal in one horizontal period.
FIGS. 2 and 3 are circuit diagrams of one embodiment of a framing code detector according to the present invention.

In FIG. 3 there is provided a NAND gate 28 having 8 inputs each connected to a respective output of the NAND gates 181-188 and a counter 26 for counting number of times an output is generated from NAND gate 28, i.e., how often framing codes with one bit error are received, during a period of 10 fields following the reception of the rest pulse. Both the count values of counters 22 and 26 are compared by CPU 5, and it is determined from this data that the desired framing code is received if the value of counter 22 is much greater than the value of counter 26, that a framing code only one bit of which is different from a desired framing code is received if the value of counter 26 is much greater than the value of counter 22, and that a framing code in which two or more bits are different from the desired framing code is received if both values of counters 22 and 26 are equal or nearly equal. CPU 5 sets into latch 14 another pattern one bit of which is different from the previously set pattern in the one bit different case, or two or more bits of which are different from previously set patterns in the two or more bits different case, until the desired pattern is detected. The output of OR gate 30 is the same as that of NAND gate 24 in FIG. 2.

As described above, the framing code detector in accordance with the present invention can detect any framing code in a serial data packet, and the embodiment shown in FIG. 2 is especially suitable for detecting a desired one among several framing codes.

We claim:

1. A framing code detector for a teletext receiver capable of receiving different broadcasting teletext signals each having a different framing code, the framing code being repeated a plurality of times in each broadcast teletext signal comprising:
   memory means for storing a pattern code corresponding to an anticipated one of said plurality of framing codes;
   comparing means for comparing a received framing code with said pattern code stored in said memory means to produce an output signal when a substantial predetermined correspondence is detected between said received framing code and said stored pattern code;
   counter means for counting the generation of said output signal of said comparing means during a predetermined period during which a framing code of a given broadcasting teletext signal is received a plurality of times by said comparing means; and
   control means for writing another pattern code into said memory means when the count value in said counter means is less than a predetermined value at the end of said predetermined period and for producing an identification signal when said count value in said counter means is equal to or greater than said predetermined value at the end of said predetermined period.

2. A framing code detector according to claim 1, wherein said comparing means includes converting means for converting received serial data forming said framing code into parallel data, and bit conparators provided for each bit of said framing code for comparing bits of said received framing code and bits of said stored pattern code.

3. A framing code detector according to claim 2, wherein each bit of said stored pattern is different from a corresponding bit of an anticipated framing code to be received, and wherein said bit comparators are EX-OR gates.

4. A framing code detector according to claim 1, wherein said comparing means includes first means for producing a first output signal when said predetermined correspondence is detected for all bits of said received framing code and said stored pattern code, said counter means being connected to receive said first output signal of said comparing means.

5. A framing code detector according to claim 4, wherein said comparing means includes second means for producing a second output signal when said predetermined correspondence is detected for all but one of the bits of said received framing code and said stored pattern code.

6. A framing code detector according to claim 5, further including additional counter means for counting the generation of said second output signal during said predetermined period, said control means including means for comparing the counts produced by said counter means and said additional counter means at the end of said predetermined period to determine whether the received framing code is the anticipated framing code corresponding to the pattern code stored in said memory means.

7. A framing code detector according to claim 1, wherein said comparing means includes a plurality of bit comparators provided for each bit of said received framing code for comparing bits of said received framing code and bits of said stored pattern code.

8. A framing code detector according to claim 7, wherein said comparing means includes first means for producing a first output signal when said predetermined correspondence is detected for all bits of said received framing code and said stored pattern code, said counter means being connected to receive said first output signal of said comparing means.

9. A framing code detector according to claim 8, wherein said first means comprises a first NAND gate having a plurality of inputs each connected to the output of a respective bit comparator and having an output connected to said counter means.

10. A framing code detector according to claim 9, wherein said comparing means includes second means for producing a second output signal when said predetermined correspondence is detected for all but one of the bits of said received framing code and said stored pattern code.

11. A framing code detector according to claim 10, wherein said second means comprises a plurality of second NAND gates each having a plurality of inputs connected to the outputs of respective bit comparators and a respectively different one of said inputs for each second NAND gate being connected to invert the received signal, and a third NAND gate having inputs connected respectively to the outputs of said second NAND gates and an output connected to said additional counter means.

12. A framing code detector according to claim 11, wherein each bit of said stored pattern is different from a corresponding bit of an anticipated framing code to be received, and wherein said bit comparators are EX-OR gates.

13. A framing code detector for a teletext receiver comprising:
memory means for storing a pattern code corresponding to a framing code of a teletext signal to be received;
first means for comparing a received framing code with said pattern code stored in said memory means to produce a first output signal when the correspondence is detected for all bits of said received framing code and said stored pattern code;
second means for counting the generation of said first output signal of said first means during a predetermined period during which a plurality of framing codes are received by said first means;
third means for producing a second output signal when the correspondence is detected for all but one of the bits of said received framing code and said stored pattern code;
fourth means for counting the generation of said second output signal during said predetermined period; and
fifth means for comparing the counts produced by said second and fourth means at the end of said predetermined period to produce a detection signal only when the count in said second means is sufficiently greater than the count in said fourth means.

14. A framing code detector for a teletext receiver comprisng:
memory means for storing an N bit pattern code corresponding to an N bit framing code of a teletext signal to be received;
N bit comparators provided for each bit of said N bit framing code, each bit comparator having one input terminal supplied with a different bit of said N bit pattern code, another input terminal supplied with a different bit of the received N bit framing code and an output terminal at which a detection signal is produced when the signal at said one input terminal corresponds to the signal at said another input terminal;
first means having N input terminals connected to said output terminals of said N bit comparators, respectively, for producing a first output signal when all N detection signals are supplied thereto;
second means for counting the generation of said first output signal of said first means during a predetermined period during which a plurality of framing codes are received by said first means;
third means having N input terminals connected to said output terminals of said N bit comparators, respectively, for producing a second output signal when all but one of N detection signals are supplied thereto;
fourth means for counting the generation of said second output signal during said predetermined period; and
fifth means for comparing the counts produced by said second and fourth means at the end of said predetermined period to produce a detection signal only when the count in said second means is sufficiently greater than the count in said fourth means.

15. A framing code detector according to claim 14, wherein said third means comprises N detection means each having N input terminals connected to said N input terminals of said third means, respectively, with a respectively different one of said input terminal for each detection means being connected to invert the received signal and an output terminal at which an output signal is produced when all but one of said N detection signals are supplied thereto; and
means connected to said output terminals of said N detection means for generating said second output signal when any one of said output signals from said N detection means is supplied thereto.

* * * * *